United States Patent

[11] 3,623,948

| [72] | Inventors | Erroll W. Dotson<br>Louisville;<br>John H. Kidwell, Alliance; Gerald D.<br>Lindstrom, North Benton, all of Ohio |
|---|---|---|
| [21] | Appl. No. | 724,026 |
| [22] | Filed | Apr. 25, 1968 |
| [45] | Patented | Nov. 30, 1971 |
| [73] | Assignee | The Babcock & Wilcox Company<br>New York, N.Y. |

[54] PRESSURIZED-WATER NUCLEAR REACTOR
8 Claims, 5 Drawing Figs.

[52] U.S. Cl. ....................................... 176/50,
176/61, 176/87
[51] Int. Cl. ......................................... G21c 15/24
[50] Field of Search ........................................ 176/50, 61,
64, 87

[56] References Cited
UNITED STATES PATENTS

| 2,990,349 | 6/1961 | Roman ........................... | 176/61 |
| 3,158,543 | 11/1964 | Sherman et al. ............... | 176/50 X |
| 3,192,120 | 6/1965 | Campbell ....................... | 176/61 X |
| 3,202,584 | 8/1965 | Bogaardt et al. ............... | 176/61 |
| 3,366,548 | 1/1968 | O'Neil ............................ | 176/61 X |
| 3,395,075 | 7/1968 | Hench ............................ | 176/61 |

*Primary Examiner*—Leland A. Sebastian
*Assistant Examiner*—Harvey E. Behrend
*Attorney*—J. Maguire

ABSTRACT: A pressurized-water nuclear reactor wherein the incoming relatively cool water entering the reactor is distributed for temperature equalization and controlled flow through the reactor core so as to minimize overheating of localized portions of the core.

PATENTED NOV 30 1971 3,623,948
FIG.1 FIG.2
FIG.3
FIG.4 FIG.5
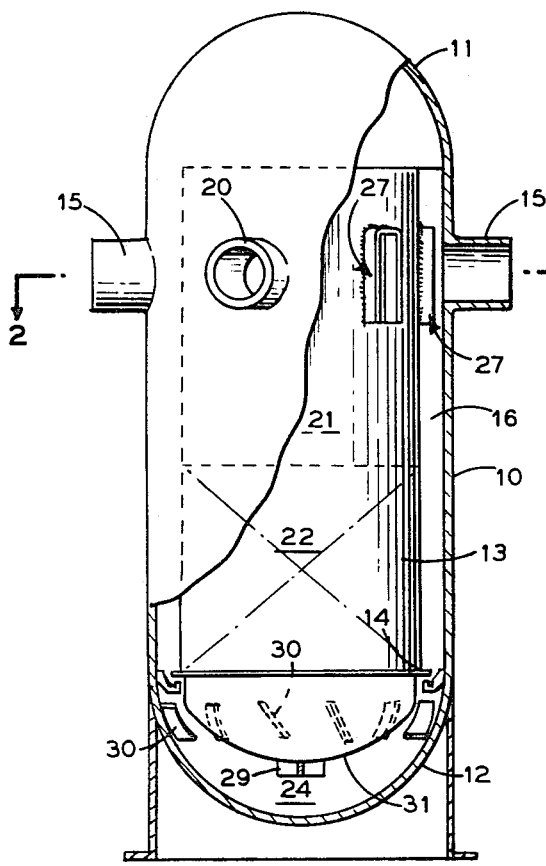
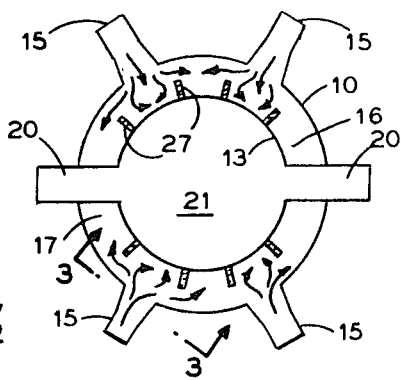
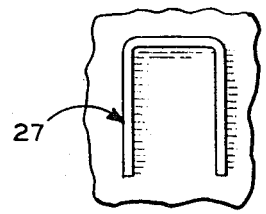
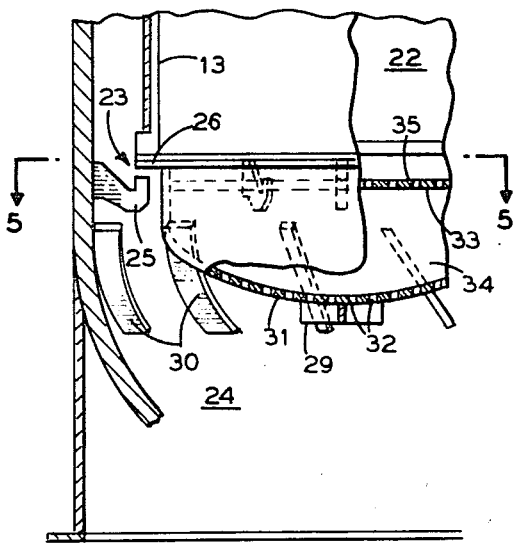
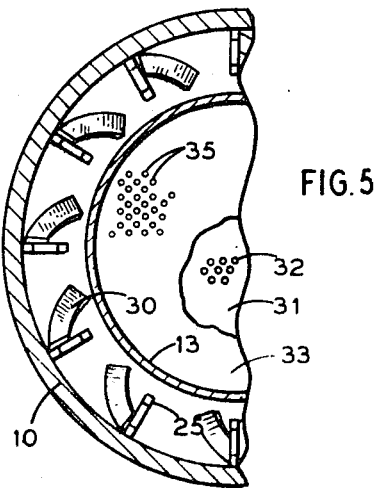
INVENTORS
Erroll W. Dotson
John H. Kidwell
Gerald D. Lindstrom
BY  *J. Maguire*
ATTORNEY

PRESSURIZED-WATER NUCLEAR REACTOR

This invention relates in general to a nuclear power reactor, and more particularly to a nuclear reactor of the pressurized water type wherein water is heated in passing through a reactor core located in a pressure vessel.

In a pressurized water reactor, large volumes of water under high pressure are forced through a reactor core to heat the water to a predetermined temperature somewhat below the saturation temperature corresponding to that pressure. Leaving the reactor vessel, the heated water (known as primary fluid) is utilized to heat lower pressure water (known as secondary fluid) so as to produce steam which is usually superheated and supplied to prime movers for the generation of electric energy. The water cooled in generating steam is thereafter recycled to the pressurized reactor so as to reheat the water and to continue the power generation cycle.

When a pressurized water reactor is used the temperature of the high-pressure water leaving the reactor must be maintained at a safe marginal temperature under the saturation temperature at the corresponding pressure. As those skilled in the art will understand, it is highly desirable to utilize as high a water temperature leaving the reactor as possible while still minimizing the generation of steam during heating of the water in the nuclear core. The necessity for maintaining the pressurized water temperature at a selected value is primarily for the safety of and to protect the operation of the nuclear core. It will be understood that any overheating, such as caused by excessive steam generation in the pressurized water can cause overheating of the core elements due to inadequate cooling. Such overheating is dangerous and might result in damage to and/or destruction of the core.

To attain safe nuclear core operation, it is necessary to provide proper distribution of water (primary fluid) flow to the core so as to obtain desired flow rates to all parts of the core as well as to equalize the temperature throughout all parts of the water entering the core.

In accordance with the present invention, we provide structure for proper distribution of water entering the nuclear core of the reactor. Since the recycled water returned to the nuclear core may enter the reactor vessel through a plurality of inlets, the inlets are arranged to open into an annular space enclosing the reactor core and are baffled to direct the water downwardly into a lower plenum chamber. The pressurized water entering and passing through the plenum chamber is given a swirling movement by the use of vanes interposed in its flow path. The swirling action of the mass of water mixes such water so as to equalize temperatures therein and to distribute the water throughout the plenum chamber. The water leaving the plenum chamber passes upwardly through a perforated inverted domed plate which further distributes the entering water and discharges into a second plenum chamber with the water thereafter passed upwardly through a perforated flat plate for controlled introduction into the multiple parallel-flow passageways of the reactor core.

Of the drawings:

FIG. 1 is an elevation, partly in section of a pressurized-water reactor constructed and arranged according to the present invention;

FIG. 2 is a schematic plan view of FIG. 1 taken on the line 2—2 of FIG. 1;

FIG. 3 is an enlarged view of a portion of the apparatus shown in FIG. 1;

FIG. 4 is an enlarged section of a portion of the apparatus shown in FIG. 1; and FIG. 5 is a section taken on line 5—5 of FIG. 4.

In the illustrated embodiment of the invention a pressurized water reactor is provided with a substantially upright pressure vessel 10 of circular cross section having a closed top 11 and an inverted domed bottom closure 12. Internally of the pressure vessel is positioned a core shield 13 which is laterally spaced from and coaxial with the inner surface of the pressure vessel wall. The core shield is attached to and suspended from the upper end portion of the pressure vessel and extends downwardly to a position 14 upwardly spaced from the lower inverted domed closure 12 of the pressure vessel.

As shown, the upper portion of the pressure vessel is provided with four circumferentially spaced water inlet nozzles 15 which discharge into an annular passageway 16 defined between the core shield and the pressure vessel walls. At this same upper level and circumferentially spaced from the inlets are positioned a pair of water outlet nozzles 20 which extend through the pressure vessel and the annular space to open into the internal space 21 defined by the core shield 13.

The reactor core 22 is positioned in the lower end portion of the core shield and is supported directly thereon by a suitable structure 23. Thus, the flow of water is from the inlet nozzles 15 downwardly through the annular passageway 16 between the pressure vessel wall and the core shield 13 to a plenum chamber 24 positioned in the lower portion of the pressure vessel. The water thereafter reverses direction and flows upwardly through the core 22 into the upper portion of the core shield and through suitable openings therein interconnected with the outlet nozzles 20.

In accordance with proper safety provisions, the pressure vessel is provided with a row of circumferentially, equally spaced brackets 25 extending inwardly from the pressure vessel wall into alignment with a flange 26 attached to the shield and forming part of the structure 23 supporting the core 22. The brackets are ordinarily out of contact with any portion of the core shield or the associate core-supporting structure. The brackets 25 are intended to prevent unusual swaying of the core shield 13 as might be caused by earthquakes or other external influences on the reactor pressure vessel and furthermore provide a support for the core in case of accidental overheating which would weaken the supporting structure of the core.

In the construction so far described the reactor core 22 is essentially surrounded by pressurized water, with the relatively cool water moving downwardly through the annular passageway 16 and then upwardly through the core for heating and through the central portion of the pressure vessel. Since it is highly desirable to have the maximum amount of sensible heat in the heated pressurized water for use in external heat exchangers (not shown) for the generation of steam in the secondary fluid and at the same time provide a temperature difference between the pressurized water operating and saturation temperatures at the prevailing pressure to protect the nuclear core, it is essential to provide a substantially uniform water flow and temperature distribution to and through the core 22. The core is of known type wherein a plurality of upright fuel rods are spaced throughout the core cross section and a plurality of parallel water flow passageways of substantially equal cross-sectional flow area are distributed throughout the core, to cool the fuel rods and to heat the water.

In accordance with the invention, an inverted U-shaped baffle 27 is positioned on the core shield 13 in alignment with each of the water inlet nozzles 15 to direct incoming water flow downwardly in the annular passageway 16. It has been found that such baffles are instrumental in improving peripheral flow distribution and assuring maximum effectiveness of the swirl vanes hereinafter described. A condition of unbalance in incoming water flow may be caused by many circumstances, such as pump malfunction and the like. Under some conditions, such as a pump failure in one of the four lines leading to the inlet nozzles, the maldistribution of water entering the core could have serious consequences on the core, unless baffles 27 and the water distribution arrangement hereinafter described were in service.

A series of inclined vanes 30 are attached to the lower inner surface of the domed bottom closure 12 to impart a swirl to the water entering the lower portion of the pressure vessel. The vanes are directly welded to the inverted domed bottom closure 12 of the pressure vessel and are inclined at an angle to a radial plane passing through the vertical axis of the vessel. It will be understood that the water passing downwardly through the annular passageway 16 will encounter the vanes so that the incoming stream will be caused to swirl in the plenum 24 or bottom portion of the pressure vessel. It will be understood that the vanes may be straight or curved and may be positioned in the annular passageway 16 between the core shield and the pressure vessel walls or could be positioned intermediate the location shown and the annular passageway 16. In the present instance it has been found desirable to position the vanes 30 directly on the inverted domed wall of the bottom closure 12 for ease of attachment and to facilitate installation.

With the vanes 30 positioned adjacent the lower surface of the plenum chamber 24, the upper marginal portion of the plenum chamber is formed by an inverted dome-shaped perforated baffle 31. A vortex inhibitor 29 is attached to the lower central portion of the dome 31 to control the rotation of the swirling mass of water entering the perforations of the dome and to increase flow to the central portion of the dome with a minimum of energy dissipation. In the embodiment shown, the perforations 32 in the domed baffle are substantially uniformly spaced in circular rows throughout the extent of the domed baffle. Alternately, and if the occasion so requires, the spacing of the perforations may be such as to unequally distribute fluid flow upwardly from the plenum chamber 24 through the dome 31. The reasons for such a construction are hereinafter described.

The structural support 23 attached to the core shield and supporting the core elements is further provided with a substantially flat perforated distributor plate 33 which in effect forms a second plenum chamber 34 between the two plates. The flat plate is likewise provided with uniformly spaced perforated holes 35 therein for distributed flow of fluid upwardly from the second plenum chamber and into the flow channels formed in the reactor core.

In the illustrated embodiment of the pressurized water reactor, the reactor is designed for the flow of approximately 130 million pounds of water per hour therethrough. This water has an incoming temperature of approximately 555° F. and an outlet temperature of approximately 604° F. The operating pressure of the water utilized as a primary fluid in leaving the pressurized reactor will be at 2,200 p.s.i.a. (pounds per square inch absolute). At this pressure, saturation temperature of the water is approximately 649.46° F. leaving a margin below saturation temperature of approximately 45° F. This temperature difference between operating temperatures and saturation temperatures is considerably below that heretofore disclosed and is intended to provide a margin of safety to avoid steam formation in the primary fluid. It will be understood that this margin is relatively narrow when considering the possible upsets of the system both as to incoming temperature differences and as to flow differences. Thus, it is highly desirable that the temperature of the water entering each of the parallel flow passageways through the reactor core should be substantially equal. Also, it is highly desirable that the flow rates through each core-cooling channel should be substantially uniform. By utilizing the distribution system described, ordinary upsets in the overall system either as to temperature or flow rates of the incoming water will not ordinarily produce more than slight conditions of steam generation within the reactor core.

In some installations it is possible that certain portions of the reactor core may have a higher heat generation ability than other portions of the core. Usually, such unbalance in heat output from the reactor elements would be concentrated in the central portion of the core. This might occur after a period of operation of the unit where certain fuel cores have been replaced and the overall reactivity of fuel elements in the core are unequal. When this is contemplated it is possible to compensate for such unequal heating by changes in the pattern of perforations in both the inverted domed baffle 31 and the flat plate baffle 33 or either of them. The illustrated arrangement contemplates substantially uniform reactivity throughout the cross section of the core and accordingly the baffles are uniformly perforated. It is, however, within the contemplation of the present invention to provide an unbalanced perforation in the baffles to compensate for unbalance in the reactivity of portions of the nuclear reactor core.

What is claimed is:

1. In a pressurized-water nuclear reactor, walls defining an upright pressure vessel of circular cross section and having upper and lower end closures, a core shield of circular cross section radially spaced inwardly of said vessel and defining an annular passageway therebetween, said core shield being attached to said pressure vessel in the upper end portion of said vessel and extending downwardly to a position spaced above said lower end closure, a reactor core positioned within the lower portion of said core shield and forming a plenum chamber therebeneath, nozzle means positioned in the upper portion of and extending through the wall of said pressure vessel and said core shield above said core to define a water outlet from said nuclear generator, the improvement comprising means for directing a distributed flow of incoming water to the lower end of said core for upward passage therethrough including inlet means radially positioned in the wall of said pressure vessel above said core and opening into said annular passageway, baffle means for directing water flow downwardly into said annular passageway, vane means positioned in said incoming water flow path to impart a swirl to said water passing through said plenum chamber, perforated plate means positioned between said plenum chamber and the lower end of said core, and a vortex inhibitor fixedly attached to the lower surface of the center portion of said perforated plate means.

2. A pressurized water reactor according to claim 1 wherein said nozzle means and said inlet means are circumferentially spaced about said pressure vessel and are located at a substantially common elevation.

3. A pressurized water reactor according to claim 1 wherein the bottom closure is an inverted dome and said vane means are attached to the internal surface thereof.

4. A pressurized water reactor according to claim 1 wherein said baffle means are of inverted U-shape and are attached to said core shield in flow alignment with each of said inlet means.

5. A pressurized water reactor according to claim 1 wherein said perforated plate means includes a perforated inverted domed plate circumferentially attached to the lower end portion of said core shield and is spaced beneath said core.

6. A pressurized water reactor according to claim 5 wherein a perforated plate baffle is positioned between the lower end of said core and said perforated inverted domed plate.

7. A pressurized water reactor according to claim 5 wherein said inverted domed plate is perforated with substantially equally spaced openings of substantially equal area.

8. A pressurized water reactor according to claim 6 wherein the openings in said perforated plate are of substantially uniform area.

* * * * *